(12) United States Patent
Arai

(10) Patent No.: US 6,668,252 B2
(45) Date of Patent: Dec. 23, 2003

(54) HIERARCHICAL STRUCTURE GENERATING METHOD AND APPARATUS GENERATING HIERARCHICAL STRUCTURE DISPLAY TABLE BASED ON PARENT-CHILD RELATIONSHIP TABLE

(75) Inventor: Koju Arai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/460,648

(22) Filed: Dec. 14, 1999

(65) Prior Publication Data

US 2003/0046300 A1 Mar. 6, 2003

(30) Foreign Application Priority Data

Dec. 18, 1998 (JP) .......................................... 10-361607

(51) Int. Cl.⁷ .............................................. G06F 17/30
(52) U.S. Cl. ......................................... 707/10; 709/225
(58) Field of Search ............................. 707/103 R, 102, 707/100, 3, 2, 6, 10; 717/108, 106, 109, 144; 709/225; 711/101; 370/254; 714/1; 710/300

(56) References Cited

U.S. PATENT DOCUMENTS

| | | | |
|---|---|---|---|
| 5,710,926 A | * | 1/1998 | Maurer ........................ 717/108 |
| 5,899,997 A | * | 5/1999 | Ellacott ....................... 707/103 |
| 6,052,693 A | * | 4/2000 | Smith et al. ................. 707/104.1 |
| 6,128,016 A | * | 10/2000 | Coelho et al. ............... 345/808 |
| 6,237,006 B1 | * | 5/2001 | Weinberg et al. ........... 707/103 |
| 6,341,280 B1 | * | 1/2002 | Glass et al. .................... 707/3 |
| 6,341,310 B1 | * | 1/2002 | Leshem et al. ............. 709/223 |
| 6,426,947 B1 | * | 7/2002 | Banker et al. ............... 370/254 |
| 6,446,068 B1 | * | 9/2002 | Kortge ........................... 707/6 |

FOREIGN PATENT DOCUMENTS

| | | |
|---|---|---|
| JP | 3-230232 | 10/1991 |
| JP | 4-287533 | 10/1992 |
| JP | 5-91105 | 4/1993 |
| JP | 6-162088 | 6/1994 |
| JP | 7-115681 | 5/1995 |
| JP | 7-154415 | 6/1995 |
| JP | 7-210527 | 8/1995 |

* cited by examiner

*Primary Examiner*—Diane D. Mizrahi
(74) *Attorney, Agent, or Firm*—Sughrue Mion, PLLC

(57) ABSTRACT

A hierarchical structure generating method and apparatus used in a communication system (for example, consisting of a parent station B and N child stations (relay station R or terminal station T) is disclosed, by which the whole hierarchical structure can be efficiently generated and displayed from the top level based on a parent-child relationship table between the constituent stations. The apparatus comprises a section for referring to a parent-child relationship table indicating each parent-child relationship between the elements, and generating and outputting a hierarchical structure display table which includes at least information for determining whether each element is a parent element; information for determining whether each parent element is a top parent element; information for determining a child element of each parent element; and information for determining another child element having the same hierarchical level of each child element, so as to analyze the hierarchical structure; and a section for generating and displaying the hierarchical structure of the elements by referring to the hierarchical structure display table.

5 Claims, 7 Drawing Sheets

| | INITIAL VALUE | 1 | 2 | 3 | 4 | 5 | |
|---|---|---|---|---|---|---|---|
| R(1) | 8 | −1 | | | | | −1 |
| R(2) | 8 | | | 0 | | | 0 |
| R(3) | 8 | | | | 0 | | 0 |
| R(4) | 8 | 0 | | 3 | | | 3 |
| R(5) | 8 | | | | −4 | | −4 |
| R(6) | 8 | | | | | 0 | 0 |
| R(7) | 8 | | 0 | | | | 0 |
| L(1) | 0 | −4 | | | | | −4 |
| L(2) | 0 | | 7 | | | | 7 |
| L(3) | 0 | | | −2 | | | −2 |
| L(4) | 0 | | | | −3 | | −3 |
| L(5) | 0 | | | | | 6 | 6 |
| L(6) | 0 | | | | | | 0 |
| L(7) | 0 | | | | | | 0 |

N=7 (NUMBER OF STATIONS)
M=5 (NUMBER OF DATA SETS OF PARENT-CHILD RELATIONSHIP TABLE)

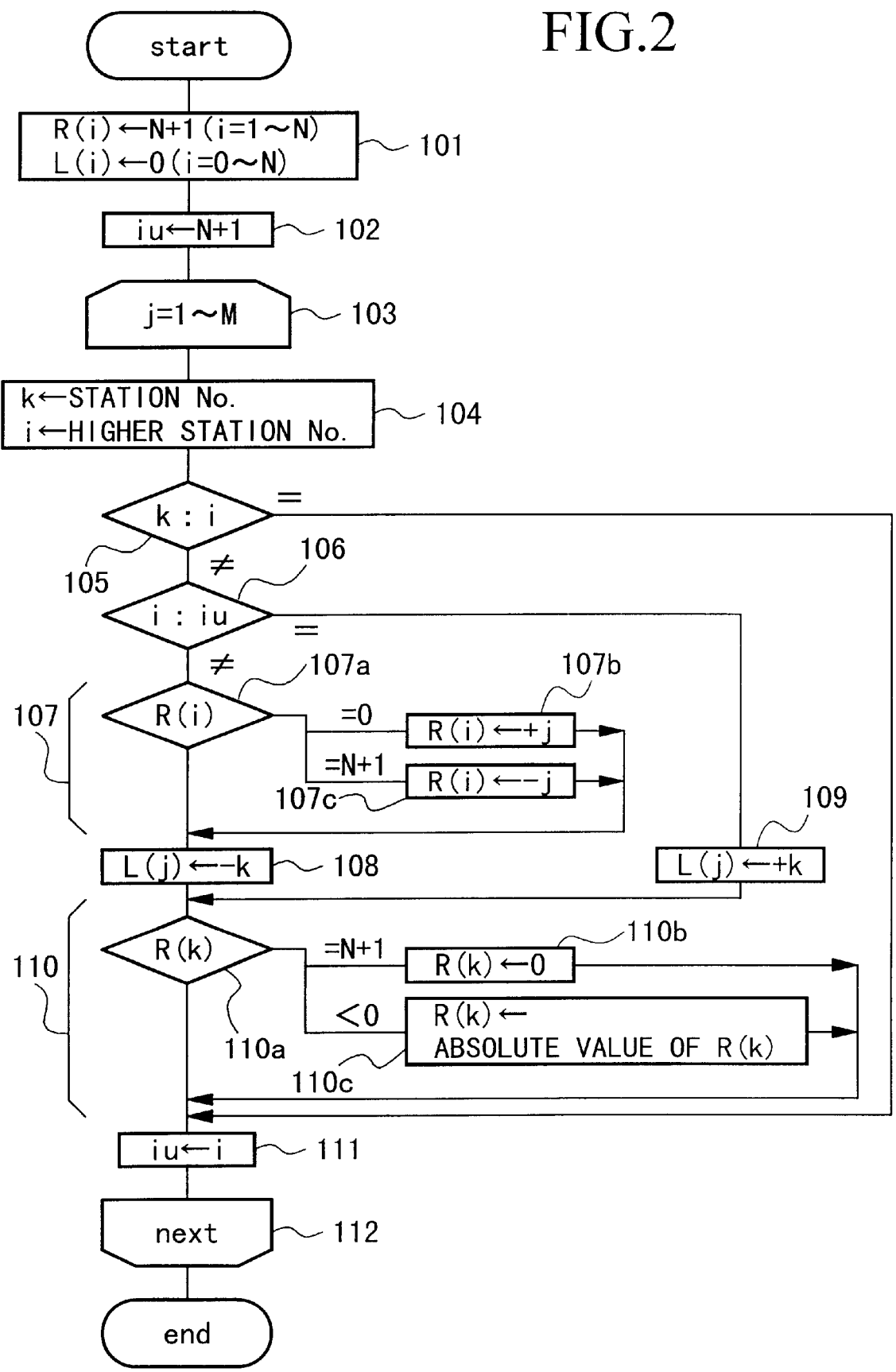

| No. (j) | HIGHER STATION No. | STATION No. |
|---|---|---|
| 1 | 1 | 4 |
| 2 | 1 | 7 |
| 3 | 4 | 2 |
| 4 | 5 | 3 |
| 5 | 5 | 6 |

|  | INITIAL VALUE | 1 | 2 | 3 | 4 | 5 |  |
|---|---|---|---|---|---|---|---|
| R(1) | 8 | −1 |  |  |  |  | −1 |
| R(2) | 8 |  |  | 0 |  |  | 0 |
| R(3) | 8 |  |  |  | 0 |  | 0 |
| R(4) | 8 | 0 |  | 3 |  |  | 3 |
| R(5) | 8 |  |  |  | −4 |  | −4 |
| R(6) | 8 |  |  |  |  | 0 | 0 |
| R(7) | 8 |  | 0 |  |  |  | 0 |
| L(1) | 0 | −4 |  |  |  |  | −4 |
| L(2) | 0 |  | 7 |  |  |  | 7 |
| L(3) | 0 |  |  | −2 |  |  | −2 |
| L(4) | 0 |  |  |  | −3 |  | −3 |
| L(5) | 0 |  |  |  |  | 6 | 6 |
| L(6) | 0 |  |  |  |  |  | 0 |
| L(7) | 0 |  |  |  |  |  | 0 |

11

N=7 (NUMBER OF STATIONS)

M=5 (NUMBER OF DATA SETS OF PARENT-CHILD RELATIONSHIP TABLE)

HIERARCHICAL STRUCTURE GENERATING METHOD AND APPARATUS GENERATING HIERARCHICAL STRUCTURE DISPLAY TABLE BASED ON PARENT-CHILD RELATIONSHIP TABLE

BACKGROUND OF THE INVENTION

1. Field of the Invention

The present invention relates to a hierarchical structure generating method and apparatus for generating and displaying the hierarchical structure of parent and child stations included in a mobile communication system or the like, by using a table for indicating each parent-child relationship of the relevant parent and child stations.

This application is based on Patent Application No. Hei 10-361607 filed in Japan, the contents of which are incorporated herein by reference.

2. Description of the Related Art

There is a conventional hierarchical structure generating method applied to mobile communication systems including parent (or base) stations and child (or sub) stations. In this method, the hierarchical structure is constructed by searching a parent-child relationship table including a plurality of data indicating each one-to-one parent-child correspondence relationship, and determining each parent-child relationship (starting from a parent station). In this conventional method, in order to search for each child station, the parent-child relationship table must be searched from the top. In particular, if the number N of the stations is large, the number of times of searching the parent-child relationship table (average: N×N/2) is also large; thus, the speed of displaying the hierarchical structure is degraded.

As for a child station, in order to determine whether a top station having a level higher than the level of its parent station is present, it is necessary to examine each parent station registered in the parent-child relationship table so as to detect whether the parent station also functions as a child station with respect to another (parent) station.

In an example communication system consisting of a parent station B and N child stations (relay station R or terminal station T), when the whole hierarchical structure is generated and displayed based on a parent-child relationship table for indicating each parent-child relationship between the constituent stations, it is necessary to position only the parent station B at the top of the displayed structure. However, if the data of the parent-child relationship table is insufficient, a relay station R may be positioned at the top in the displayed structure, that is, some top stations may be displayed in practice.

On the other hand, if the hierarchical structure of a communication system is displayed in a monitoring system of the communication system, it is generally necessary to display each station in the order from the top in turn. If the order is not kept, a system error occurs and the hierarchical structure cannot be displayed. Therefore, a process for specifying the top station is also necessary when the hierarchical structure is displayed.

SUMMARY OF THE INVENTION

In consideration of the above circumstances, an objective of the present invention is to provide a hierarchical structure generating method and apparatus used in a communication system (for example, consisting of a parent station B and N child stations (relay station R or terminal station T), by which the whole hierarchical structure can be efficiently generated and displayed from the top level based on a parent-child relationship table between the constituent stations. More specifically, the objective is to provide a hierarchical structure generating method and apparatus used in such a communication system, by which when the hierarchical structure is generated and displayed, it is unnecessary to search the parent-child relationship table every time each station is searched for, but each parent-child relationship can be referred to only by a single search, and a top station other than the current parent station can be detected also by a single search, thereby efficiently generating and displaying the whole hierarchical structure from the top level in turn.

Therefore, the present invention provides a method of generating a hierarchical structure including a plurality of elements having parent-child relationships, comprising the steps of:

referring to a parent-child relationship table indicating each parent-child relationship between the elements, and generating and outputting a hierarchical structure display table which includes at least information for determining whether each element is a parent element; information for determining whether each parent element is a top parent element; information for determining a child element of each parent element; and information for determining another child element having the same hierarchical level of each child element, so as to analyze the hierarchical structure; and generating and displaying the hierarchical structure of the elements by referring to the hierarchical structure display table.

In the above method, the hierarchical structure display table may consist of one or more array variables.

Preferably, the element number, the value, and the sign of the value of each element of said one or more array variables are specified so as to indicate all of said information.

Typically, the elements having parent-child relationships correspond to one or more parent stations and N child stations, N being a natural number, which constitute a communication system.

The present invention also provides an apparatus for generating a hierarchical structure including a plurality of elements having parent-child relationships, comprising:

a hierarchical structure analyzing section for referring to a parent-child relationship table indicating each parent-child relationship between the elements, and generating and outputting a hierarchical structure display table which includes at least information for determining whether each element is a parent element; information for determining whether each parent element is a top parent element; information for determining a child element of each parent element; and information for determining another child element having the same hierarchical level of each child element, so as to analyze the hierarchical structure; and a hierarchical structure display section for generating and displaying the hierarchical structure of the elements by referring to the hierarchical structure display table.

According to the present invention, the above hierarchical structure display table is generated and displayed by referring to a parent-child relationship table, and the hierarchical structure of the constituent elements, thereby efficiently generating and displaying the hierarchical structure from the top level.

BRIEF DESCRIPTION OF THE DRAWINGS

FIG. 2 is an operational flowchart of the hierarchical structure analyzing section 100 of FIG. 1.

FIG. 5 is a diagram for explaining the operation (performed by the hierarchical structure analyzing section 100 of FIG. 1 along the operational flow as shown in FIG. 2) of analyzing the hierarchical structure, which shows the variation of each variable in the process of outputting the hierarchical structure display table 11 according to the parent-child relationship table 10 of FIG. 4.

DESCRIPTION OF THE PREFERRED EMBODIMENTS

Hereinafter, an embodiment of the present invention will be explained with reference to the drawings. In the following embodiment, the present invention is applied to a mobile communication system, but the applicable fields of the present invention are not limited to such a system, and may include any system having a hierarchical structure including parent-child relationships.

Figure 1:
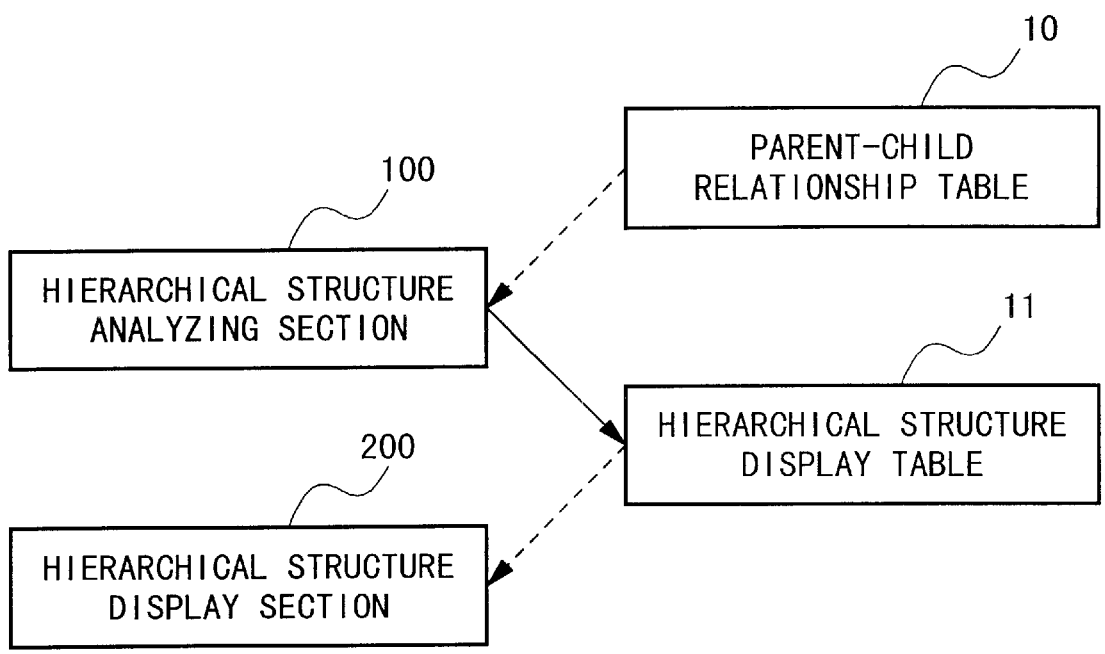
FIG. 1 is a block diagram showing the structure of the hierarchical structure generating apparatus as an embodiment according to the present invention.

FIG. 1 is a block diagram showing the structure of an embodiment of the hierarchical structure generating apparatus according to the present invention.

In the embodiment shown in FIG. 1, hierarchical structure analyzing section 100 refers to parent-child relationship table 10 storing a plurality of data indicating each parent-child relationship between the stations, so as to generate and output hierarchical structure display table 11 which is used as intermediate data for displaying the hierarchical structure. The hierarchical structure display section 200 generates and displays the finally fixed hierarchical structure based on the hierarchical structure display table 11.

Typically, each section is realized using a CPU (central processing unit), peripheral devices such as a memory device, and software programs executed using the CPU and the peripheral devices. These constituents are included in a monitoring system for monitoring the communication system, or one or more parent stations B and N child stations (relay station R and terminal station T) of the system. Here, each table consists of a plurality of data stored in the memory device. In addition, the hierarchical structure analyzing section 100 and the hierarchical structure display section 200 may be separately provided in different units, and be connected with each other via a communication line.

Figure 3A:
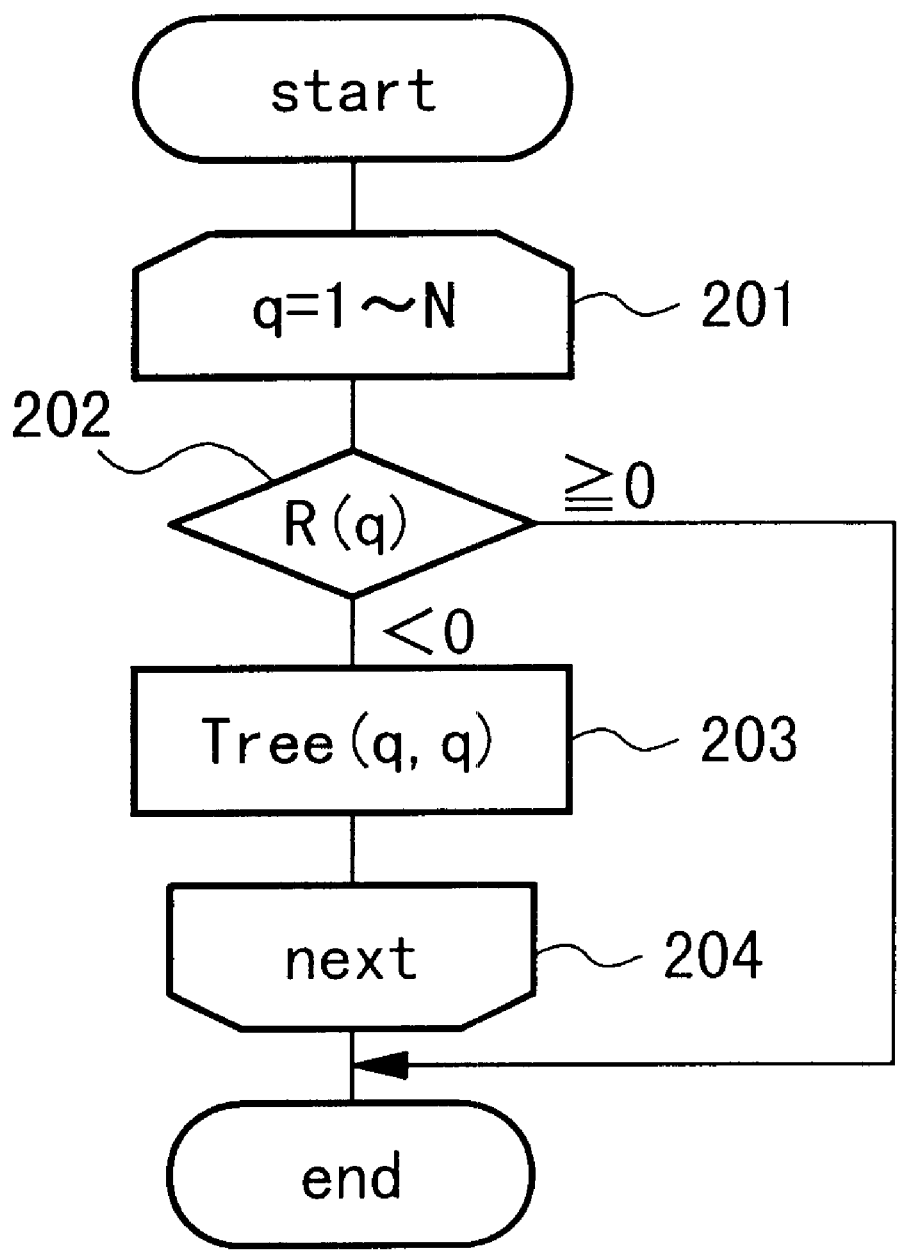
FIGS. 3A and 3B are operational flowcharts of the hierarchical structure display section 200 of FIG. 1.
Figure 3B:
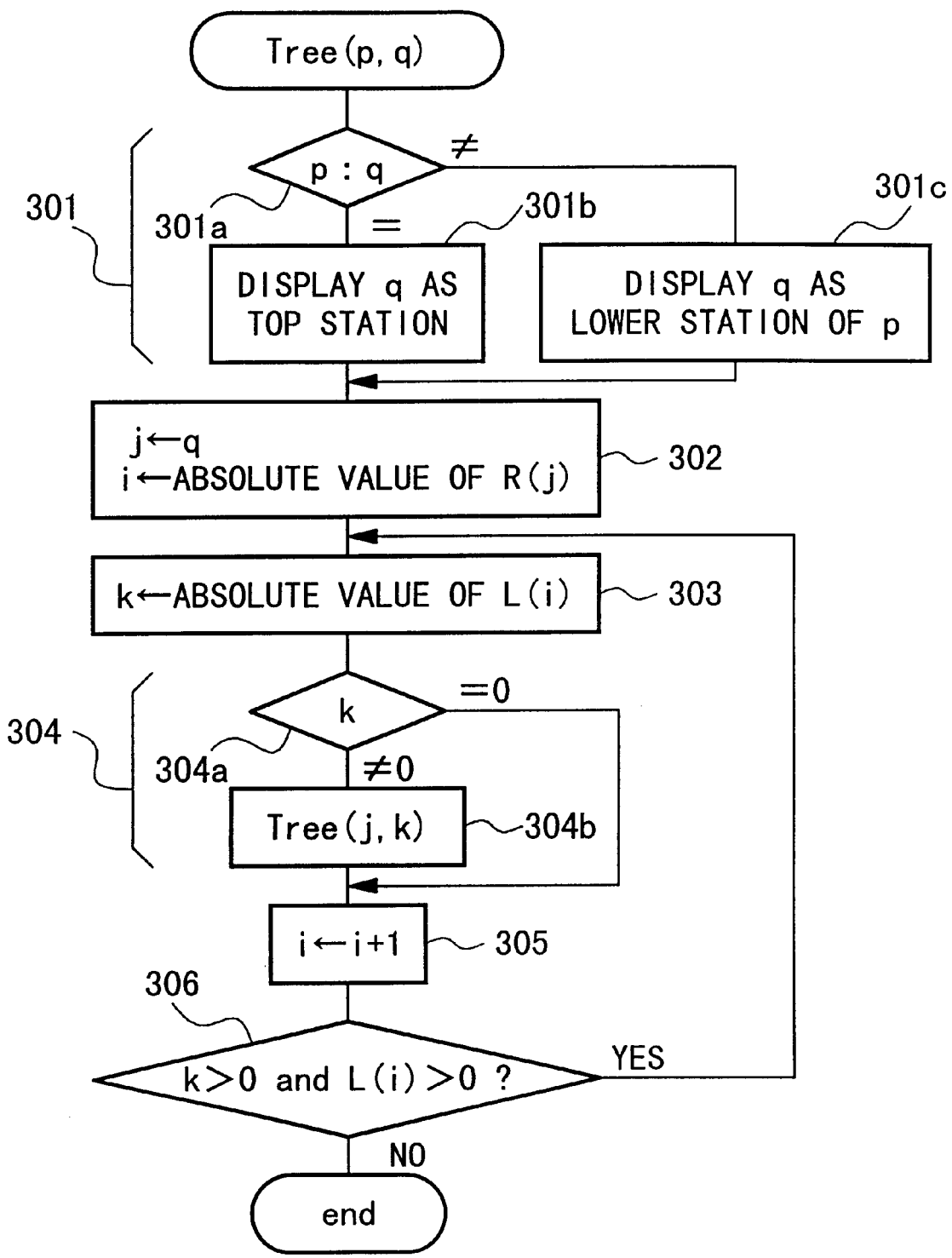
Figures 4A, 4B:
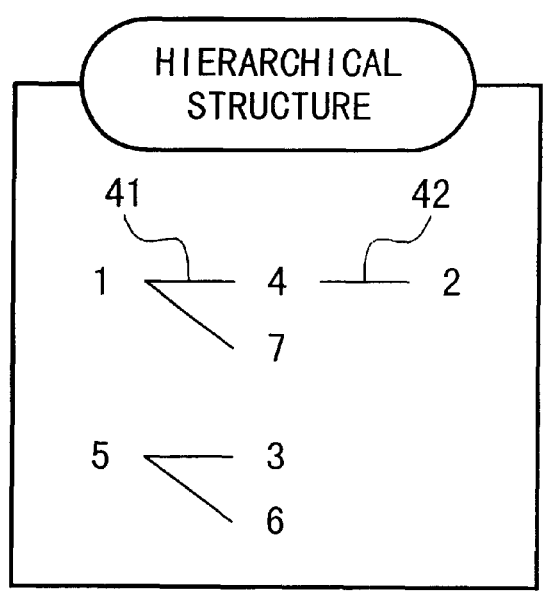
FIG. 4A is a diagram showing an example of the parent-child relationship table 10 in FIG. 1.
FIG. 4B is the hierarchical structure corresponding to this example.

FIG. 2 is the operational flowchart of the hierarchical structure analyzing section 100, while FIGS. 3A and 3B are the operational flowchart of the hierarchical structure display section 200. FIG. 4A is a diagram showing an example of parent-child relationship table 10.

The parent-child relationship table 10 shown in FIG. 4A includes a plurality of data indicating each parent-child relationship between the stations 1 to 7 which have the hierarchical structure shown in FIG. 4B. In the parent-child relationship table 10 of this case, each line corresponds to each parent-child relationship. The data included in each line (called each data set) are the first item "No." indicating the line number (which corresponds to variable j in FIG. 5 explained later), the second item "HIGHER STATION No." indicating the parent station of each parent-child relationship, and the third item "STATION No." indicating the corresponding child station. For example, the first line (line No.=1) shows parent-child relationship 41 (see FIG. 4B) in which station 1 is the parent station while station 4 is its child station, while the third line (line No.=3) shows another parent-child relationship 42 (see FIG. 4B) in which station 4 is the parent station while station 2 is its child station.

FIG. 5 is a diagram for explaining the operation (performed by the hierarchical structure analyzing section 100 along the operational flow as shown in FIG. 2) of analyzing the hierarchical structure, which shows the variation of each variable in the process of outputting the hierarchical structure display table 11 of FIG. 1 according to the parent-child relationship table 10 of FIG. 4.

In FIG. 5, variable j corresponds to variable j, shown in FIG. 2, which is increased by 1 for each cycle from step 103 to step 112. That is, j has one of values 1 to number M (=5) of the data sets of the parent-child relationship table 10 shown in FIG. 4A.

Array variables R(i) and L(i) (i=1 to N, where N is the number of the stations) respectively have initial values 8 and 0. The array variables vary through steps 103 to 112 depending on variable j whose value also varies, and these array variables are used for generating the hierarchical structure display table 11.

FIG. 5 shows the relevant values after each change of the array variables R(i) and L(i). For example, the value of R(1) is changed to −1 while j=1, while the value of R(4) is changed to 0 while j=1 and again changed to 3 while j=3.

Each element of array R(i), a constituent for generating the hierarchical structure display table 11, has a specific value and positive or negative sign, thereby indicating the following items:

(i) whether station i is a parent station, that is, has a child station connected thereto (in the case of FIG. 5, when R(i) has a value other than 0 or 8 (initial value), the station i is the parent station), (ii) when station i is the parent station, whether the station i is the highest parent station, that is, the top station (in the case of FIG. 5, when R(i) has a value other than 0 or 8 (initial value) and also has the negative sign, the station i is the top station), (iii) when station i is the parent station, the absolute value |R(i)| of R(i) indicates that element L(|R(i)|) of array L(i) has a value corresponding to the station No. (of a relevant child station) which is stored in the data-set line (of the parent-child relationship table 10) having the smallest line number.

In the case of FIG. 5, if station i is a child station having no child station connected thereto, R(i) is set to 0. Additionally, in the present embodiment, if data of station i is not included in parent-child relationship table 10, R(i) keeps the initial value 8 (no such station is present in the case shown in FIG. 5).

In the example shown by FIG. 5, R(1), R(4), and R(5) of the hierarchical structure display table 11 respectively have values −1, 3, and −4; thus, as shown in FIG. 4B, stations 1, 4, and 5 are parent stations, and the stations 1 and 5 are the top stations. In addition, the station No. 4 of the first child station of station 1 is stored in variable L(1) (here, the stored value having the negative sign), the station No. 2 of the first child station of station 4 is stored in variable L(3) (here, the stored value also having the negative sign), and the station No. 3 of the first child station of station 5 is stored in variable L(4) (here, the stored value also having the negative sign).

The remaining elements R(2), R(3), R(6), and R(7) have value 0, thereby indicating that stations 2, 3, 6, and 7 are child stations included in the hierarchical structure.

On the other hand, each element of array variable L(i), another constituent for generating the hierarchical structure display table 11, has the element number equal to the corresponding data-set (i.e., line) No., where the element corresponds to the station No. of the relevant child station included in the parent-child relationship table 10, and has the absolute value (i.e., integer) of the corresponding station No., to which a positive or negative sign is appended. The positive or negative sign indicates that whether another child station connected to the parent station of the relevant child station is present, that is, whether another child station having the same hierarchical level is present.

In the example as shown by FIG. 5, each element of array L(i) has the absolute value equal to the station No. of the child station in the ith data set in the parent-child relationship table 10. If another child station having the same hierarchical level is present in the (i−1)th data set of the hierarchical structure display table 10, the absolute value has a positive sign (refer to L(2) and L(5)), or else (that is, no such child station exists) the absolute value has a negative sign (refer to L(1), L(3) and L(4)). If no data set corresponding to i is present in the parent-child relationship table 10, the element has and keeps its initial value 0 (refer to L(6) and L(7) of FIG. 5).

The method of setting values assigned to the elements of each array for generating the hierarchical structure display table 11 is not limited to the above case, but any modification is possible, for example, the initial values may be changed, or the positive and negative signs may be reversed.

The operations of each structural element of FIG. 1 of the present embodiment will be explained below.

(1) Operation of hierarchical structure analyzing section 100

Based on the flowchart of FIG. 2, the operation will be explained using FIGS. 4 and 5. Here, it is assumed that data of the parent-child relationship table 10 of FIG. 4 is sorted in advance in the order of the higher station No. (from the smallest to the largest), and that no duplicate station No. is used.

First, variables R(i) (i=1 to N) and L(i) (i=0 to N) in the hierarchical structure display table 10 are initialized (see step 101). Here, N is the number of stations, and value N+1 is substituted (or input) into R(i) while value 0 is substituted into L(i).

Next, work variable "iu" (used for storing the higher station No.) is initialized, that is, N+1 is given to variable iu (see step 102). Next, the processes from step 103 to step 112 are repeated from j=1 to M (M is the number of data items (i.e., the number of lines) of the parent-child relationship table 10).

In step 104, the jth data of the parent-child relationship table is referred to, and the relevant station No. is substituted into variable k while the relevant higher station No. is substituted into variable i. In the next step 105, variables k and i are compared, and if they equal each other, the operation jumps to step 111, or else the operation proceeds to the next step 106. In step 106, variables i and iu are compared, and if they are not equal to each other, the operation proceeds to step 107a, or else the operation jumps to step 109.

In step 107a, the value of variable R(i) is checked, and if R(i)=0, then +j is substituted into R(i) (see step 107b), or if R(i)=N+1, then −j is substituted into R(i) (see step 107c). In the next step 108, −k is substituted into L(j), and the operation proceeds to step 110a. On the other hand, in step 109, +k is substituted into L(j), and the operation proceeds to step 110a.

In step 110a, the value of variable R(k) is checked, and if R(k)=N+1, then 0 is substituted into R(k) (see step 110b), or if R(k)<0, then the absolute value of R(k) is substituted into R(k) (see step 110c). In the next step 111, the value of variable i is substituted into variable iu (that is, the higher station No. is saved in variable iu).

In the above way, the hierarchical structure analyzing section 200 uses input data from the parent-child relationship table shown in FIG. 4 and changes variable j from 1 to M (=5), and sets variables R(i) and L(i) (as shown in FIG. 5) while executing steps 104 to 111, and lastly generates and outputs the hierarchical structure display table 11 of FIG. 5.

In FIG. 2, in the process 107 consisting of steps 107a to 107c, if the current higher station (having the higher station No. i) was already processed as a lower station in an earlier process (related to step 110b), the positive value of j (the array element number of variable L(j) which stores the station No. (−k) of the relevant child station) is substituted into variable R(i) (see step 107b). While if the current higher station has not yet been processed (that is, the initial value is still kept), the negative value of j, the element number of variable L(j), is substituted into variable R(i) so as to determine the current higher station as the top parent station (see step 107c).

In the process 110 consisting of steps 110a to 110c, if the current station having station No. k has not yet been processed yet, variable R(k) is set to 0 so as to indicate that this station is not a parent station but a child station (see step 110b), or if a value other than the initial value has already been given as the top parent station (see step 107c), the value of variable R(k) is changed to a positive value which indicates a parent station but not the top parent station (see step 110c).

(2) Operation of Hierarchical Structure Display Section 200

Figure 6:
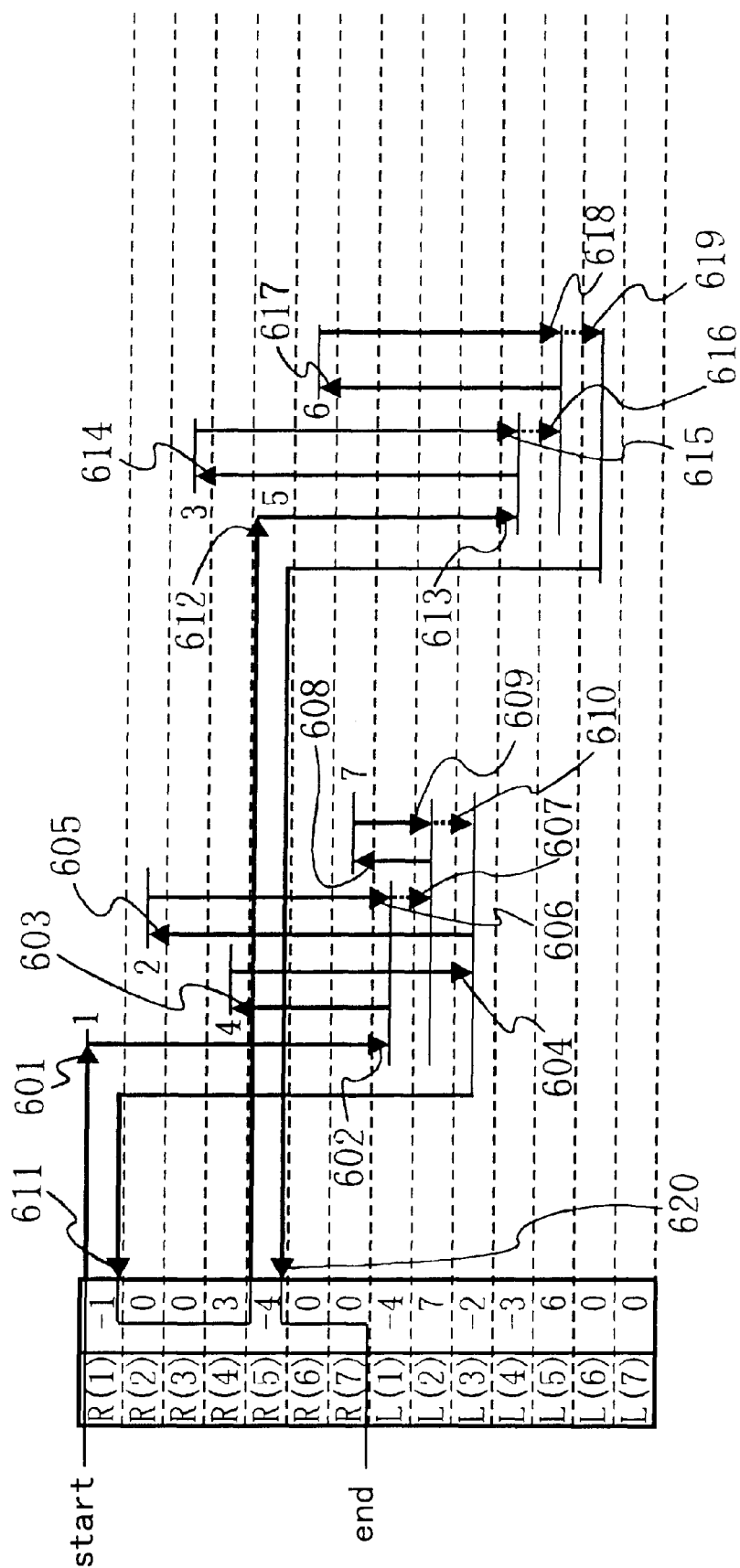
FIG. 6 is a diagram for explaining the processes (executed by the hierarchical structure display section 200 of FIG. 1) for displaying the hierarchical structure based on the hierarchical structure display table 11.

Referring to the flowcharts of FIGS. 3A and 3B, the operation of the hierarchical structure display section 200 will be explained using FIG. 6. FIG. 6 is a diagram for explaining the processes (performed by the hierarchical structure display section 200) for displaying the hierarchical structure based on the hierarchical structure display table 11.

In the main routine (i.e., steps 201 to 204) of FIG. 3A, the hierarchical structure display section 200 of FIG. 1 changes variable q from 1 to N and simultaneously checks R(q) (see step 202) while referring to the hierarchical structure display table 11, and repeats the processes firm steps 201 to 204. In the repetition, if R(q) has a negative value, the hierarchical structure display section 200 calls function Tree(q, q).

In function Tree (p, q) (see FIG. 3B), variables p and q are compared (see step 301a), and if p=q, then variable q is displayed as the top station (see step 301b), while if p≠q, then variable q is displayed as a lower station of the station indicated by variable p (see step 301c). The steps 301a to 301c constitute process 301 for displaying the hierarchical structure.

In the next step 302, the value of variable q is substituted into variable j, and the absolute value of array variable R(j) of the hierarchical structure display table 11 is substituted into variable i. In step 303, the absolute value of array variable L(i) of the hierarchical structure display table 11 is substituted into variable k. The value of variable k is then checked (see step 304a), and if k=0, then the operation jumps to step 305, while if k≠0, then function Tree (j, k) is recursively called and executed using arguments j and k (see step 304b). Here, in the process 304 consisting of steps 304a to 304c, if k (i.e., variable L(i)) is not 0, that is, if a lower station to be further called is present in the same level of the hierarchical structure, then function Tree is called.

In step 305, variable i is increased by 1, and if the conditions that variable k>0 and variable L(i)>0 are satisfied in step 306, then the operation returns to step 303 and the process of calling function Tree (of step 304) is again executed for the same variable j (that is, with respect to another child station connected to the same parent station).

In this way, the hierarchical structure display section 200 efficiently generates and displays the hierarchical structure shown in FIG. 4B by using the hierarchical structure display table 11 (of FIG. 5) according to the processes as shown in FIG. 6, that is, along a simple path without searching the hierarchical structure display table 11 from the top.

Below, the diagram of FIG. 6 for indicating the processes of displaying the hierarchical structure will be explained in detail. FIG. 6 shows each process for displaying the hierarchical structure as shown in FIG. 4B with reference to the hierarchical structure display table 11 of FIG. 5.

In the flowcharts of FIGS. 3A and 3B, first, when variable q=1, function Tree (1, 1) is called and the station No. 1 is displayed as the top station (see reference numeral 601 in FIG. 6). Next, variable R(1) is referred to, and the function Tree (1, 4) is executed using argument k which is the absolute value of "L(1)=−4" based on variable R(1) (see reference numerals 602 and 603), thereby displaying the station No. 4 as a lower station of the station No. 1.

Next, variable R(4) is referred to, and the function Tree (4, 2) is executed using argument k which is the absolute value of "L(3)=−2" (see reference numerals 604 and 605), thereby displaying the station No. 2 as a lower station of the station No. 4.

In function Tree (4, 2), variable R(2)=0=i; thus, variable L(0)=0=k, and the execution of function Tree (4, 2) is finished (see reference numeral 606). Next, function Tree (1, 7) is called using a different argument which is the absolute value (7) of L(1+1)=L(2) (the previous argument is the absolute value (4) of L(1)) (see reference numerals 607 and 608), thereby displaying the station No. 7 as a lower station of the station No. 1. Here, R(7)=0; thus, k=0 and the execution of function Tree (1, 7) is finished (see reference numeral 609). In addition, L(2+1)=L(3)=−2 (see reference numeral 610), thus the execution of function Tree (1, 1) is finished (see reference numeral 611).

Next, function Tree (5, 5) is called and executed in step 203 of the main routine, and the station No. 5 is displayed as the top station (see reference numeral 612). Next, variable R(5) is referred to, and function Tree (5, 3) is executed with argument k which is the absolute value of L(4)=−3 (see reference numerals 613 and 614), thereby displaying the station No. 3 as a lower station of the station No. 5.

In the execution of function Tree (5, 3), variable R(3)=0; thus, variable L(0)=k=0 and the execution of function Tree (5, 3) is finished (see reference numeral 615). Next, function Tree (5, 6) is called using a different argument which is the absolute value (6) of L(4+1)=L(5) (the previous argument is the absolute value (3) of L(4)) (see reference numerals 616 and 617), thereby displaying the station No. 6 as a lower station of the station No. 5. Here, R(6)=0; thus, k=0 and the execution of function Tree (5, 6) is finished (see reference numeral 618). In addition, L(5+1)=L(6)=0 (see reference numeral 619); thus, the execution of function Tree (5, 5) is finished (see reference numeral 620).

In the above way, the hierarchical structure as shown in FIG. 4B is displayed.

The present invention is not limited to the above embodiment. For example, even if the parent-child relationship data related to stations No. 1 to N has a blank, the hierarchical structure of the stations having necessary information can be generated and displayed.

In the above embodiment, the hierarchical structure display table 11 consists of array variables R and L, that is, having two variable names; however, the structure of the hierarchical structure display table 11 is not limited to this form. For example, the array variable R may be divided into two array variables R1 and R2 and the array variable L may be divided into two array variables L1 and L2, where the variables R1 and L1 have information on the absolute values of variables R and L, and variables R2 and L2 have information on the (positive or negative) signs of variables R and L. In this case, a similar hierarchical structure display table can be constructed using the array variables having four variable names. As another example for obtaining a similar hierarchical structure display table, the hierarchical structure display table 11 may be constructed using a single array variable, where (i) the odd element numbers are assigned to array variable R and the even element numbers are assigned to array variable L, or (ii) a predetermined offset value is defined for realizing a function similar to that using the array variables R and L, by adding or not adding the offset value.

What is claimed is:

1. A method of generating a hierarchical structure including a plurality of elements having parent-child relationships, comprising the steps of:

referring to a parent-child relationship table indicating each parent-child relationship between the elements, and generating and outputting a hierarchical structure display table which includes at least information for determining whether each element is a parent element; information for determining whether each parent element is a top parent element; information for determining a child element of each parent element; and information for determining another child element having the same hierarchical level of each child element, so as to analyze the hierarchical structure; and generating and displaying the hierarchical structure of the elements by referring to the hierarchical structure display table, wherein the hierarchical structure display table consists of one or more array variables, and wherein the elements having parent-child relationships correspond to one or more parent stations and N child stations, N being a natural number, which constitute a communication system.

2. A method as claimed in claim 1, wherein the element number, the value, and the sign of the value of each element of said one or more array variables are specified so as to indicate all of said information.

3. A method of generating a hierarchical structure including a plurality of elements having parent-child relationships, comprising the steps of:

referring to a parent-child relationship table indicating each parent-child relationship between the elements, and generating and outputting a hierarchical structure display table which includes at least information for determining whether each element is a parent element; information for determining whether each parent element is a top parent element; information for determining a child element of each parent element; and information for determining another child element having the same hierarchical level of each child element, so as to analyze the hierarchical structure; and generating and displaying the hierarchical structure of the elements by referring to the hierarchical structure display table kind wherein the elements having parent-child relationships correspond to one or more parent stations and N child stations, N being a natural number, which constitute a communication system.

4. An apparatus of generating a hierarchical structure including a plurality of elements having parent-child relationships, comprising:

a hierarchical structure analyzing section for referring to a parent-child relationship table indicating each parent-child relationship between the elements, and generating and outputting a hierarchical structure display table which includes at least information for determining whether each parent element is a top parent element, information for determining a child element of each parent element; and information for determining another child element having the same hierarchical level of each child element, so as to analyze the hierarchical structure; and a hierarchical structure display section for generating and displaying the hierarchical structure of the elements by referring to the hierarchical structure display table, wherein the elements having parent-child relationships correspond to one or more parent stations and N child stations, N being a natural number, which constitute a communication system.

5. A system for generating a hierarchical structure including a plurality of elements having parent-child relationships, the system comprising:

means for referring to a parent-child relationship table indicating each parent-child relationship between the elements;

means for generating and outputting a hierarchical structure display table which includes at least information for determining whether each element is a parent element; information for determining whether each parent element is a top parent element; information for determining a child element of each parent element; and information for determining another child element having the same hierarchical level of each child element; and means for generating and displaying the hierarchical structure of the elements by referring to the hierarchical structure display table, wherein the elements having parent-child relationships correspond to one or more parent stations and N child stations, N being a natural number, which constitute a communication system.

\* \* \* \* \*